United States Patent
Lee

(10) Patent No.: US 8,029,869 B2
(45) Date of Patent: Oct. 4, 2011

(54) STRUCTURE FABRICATION USING NANOPARTICLES

(75) Inventor: Kwangyeol Lee, Namyangju-si (KR)

(73) Assignee: Korea University Research and Business Foundation, Seoul (KR)

( * ) Notice: Subject to any disclaimer, the term of this patent is extended or adjusted under 35 U.S.C. 154(b) by 83 days.

(21) Appl. No.: 12/500,904

(22) Filed: Jul. 10, 2009

(65) Prior Publication Data

US 2011/0008549 A1    Jan. 13, 2011

(51) Int. Cl.
*B05D 1/04* (2006.01)
(52) U.S. Cl. .................. 427/474; 427/458; 427/472
(58) Field of Classification Search .......... 427/458, 427/472, 474
See application file for complete search history.

(56) References Cited

U.S. PATENT DOCUMENTS

| | | | | |
|---|---|---|---|---|
| 5,512,131 A | * | 4/1996 | Kumar et al. | 438/738 |
| 6,458,426 B1 | * | 10/2002 | Bulovic et al. | 427/458 |
| 2005/0064618 A1 | | 3/2005 | Brown et al. | |
| 2006/0093749 A1 | * | 5/2006 | Kim et al. | 427/458 |
| 2006/0211327 A1 | | 9/2006 | Lee et al. | |
| 2009/0074950 A1 | | 3/2009 | Sinha | |

FOREIGN PATENT DOCUMENTS

| | | |
|---|---|---|
| GB | 2432257 A | 5/2007 |
| JP | 2005104750 A | 4/2005 |

OTHER PUBLICATIONS

Dahl-Young Khang, et al "A Stretchable Form of Single-Crystal Silicon for High-Performance Electronics on Rubber Substrates" Science 311, 208, Jan. 13, 2006; DOI: 10.1126/science.1121401 pp. 208-212.
International Search Report and Written Opinion from International Application No. PCT/KR2010/004361 dated Sep. 30, 2010.

* cited by examiner

*Primary Examiner* — Frederick Parker
(74) *Attorney, Agent, or Firm* — Workman Nydegger

(57) ABSTRACT

Techniques for fabricating a structure from nanoparticles are generally described. Some example techniques are methods for fabricating an apparatus from nanoparticles. Example methods may include providing nanoparticles that are electrically charged with a first polarity and collecting the nanoparticles on a particle collection device having a second polarity opposite the first polarity. The nanoparticles can then be transferred onto a base structure from the particle collection device.

18 Claims, 9 Drawing Sheets

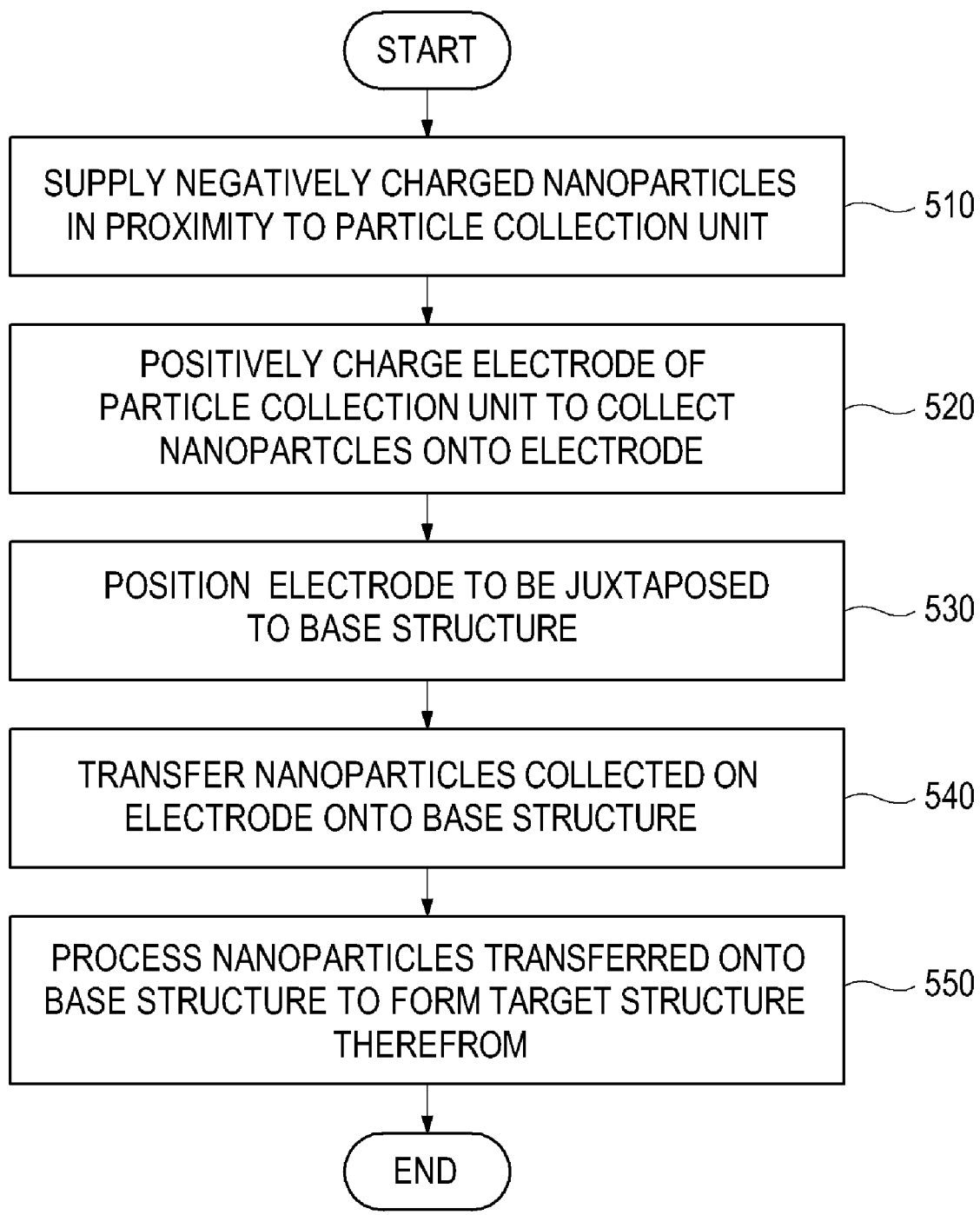

ured to move and place particle collection unit 120 to a

STRUCTURE FABRICATION USING NANOPARTICLES

BACKGROUND

Nanotechnology refers to a field involving manipulation and manufacture of materials and devices on the scale of nanometers (i.e., billionths of a meter). Structures the size of few hundred nanometers or smaller (i.e., nanostructures) have garnered attention due to their potential in creating many new devices with wide-ranging applications, including optic, electronic, and magnetic applications. It has been envisioned that nanostructures may be used in manufacturing smaller, lighter, and/or stronger devices with desirable optical, electrical, and/or mechanical properties. However, to successfully realize such devices, significant challenges must be overcome. New and improved tools are needed to control the properties and structure of materials at the nanoscale. Further, new and improved tools are needed for assembling such materials into nanostructures and for the further assembly of such nanostructures into more-complex devices.

SUMMARY

Techniques for fabricating a structure from nanoparticles and apparatuses for fabricating a structure from nanoparticles are provided. In one embodiment, a method performed under the control of at least one apparatus for fabricating a structure from nanoparticles includes supplying a plurality of nanoparticles electrically charged with a first polarity in proximity to a particle collection device having a planar surface on a portion thereof, electrically charging the planar surface of the particle collection device having a planar surface on a portion thereof, electrically charging the planar surface of the particle collection device with a second polarity opposite the first polarity, so as to collect the supplied nanoparticles onto at least a portion of the planar surface of the particle collection device, positioning the planar surface of the particle collection device to be juxtaposed to a base structure, and transferring the nanoparticles collected on the planar surface of the particle collection device onto at least a portion of the base structure.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 5 shows a flow diagram of an illustrative embodiment of a method for fabricating a structure.

DETAILED DESCRIPTION

Figure 1:
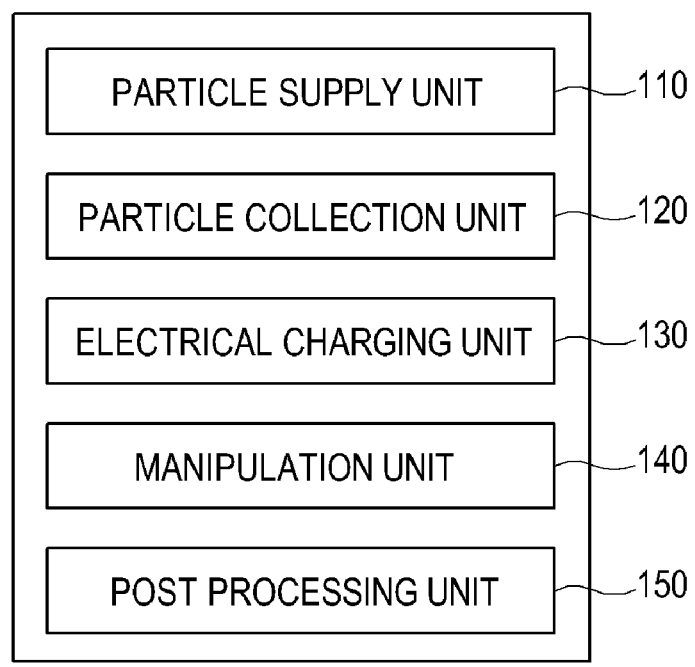
FIG. 1 is a schematic diagram of an illustrative embodiment of a structure fabrication apparatus.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

Small-scale structures, such as nanostructures, which may be suitable for creating many new devices with wide-ranging applications, are difficult to fabricate due to their small size. Effective manipulation of molecules or clusters thereof (i.e., nanoparticles) may be employed in fabricating such nanostructures. Techniques described in the present disclosure may employ electric fields to collect and transfer nanoparticles onto desired locations of a base structure. Such nanoparticles that have been transferred onto the base structure may be further processed to attain a desired structure on the base structure. In some embodiments, the transferred nanoparticles may be further processed to form one or more thin films on the base structure.

Figure 2A:
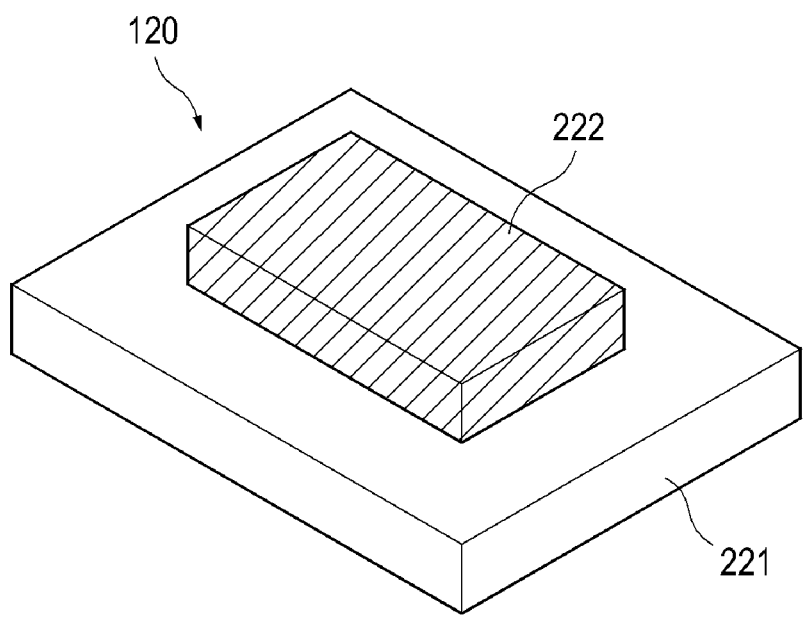
FIG. 2A shows a perspective view of an illustrative embodiment of a particle collection unit of FIG. 1.
Figure 2B:
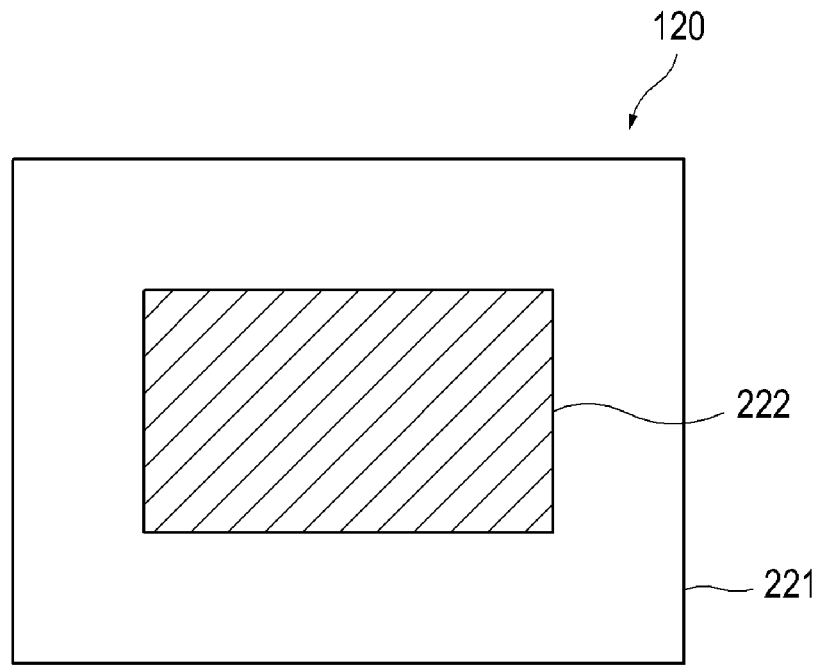
FIG. 2B shows a planar view of an illustrative embodiment of a particle collection unit of FIG. 1.

FIG. 1 is a schematic diagram of an illustrative embodiment of a structure fabrication apparatus. FIGS. 2A and 2B respectively show perspective and planar views of an illustrative embodiment of a particle collection unit of FIG. 1. Referring to FIG. 1, a structure fabrication apparatus 100 may include a particle supply unit 110 configured to supply multiple electrically-charged nanoparticles, a particle collection unit 120, an electrical charging unit 130 configured to electrically charge at least a portion(s) of particle collection unit 120 so as to collect the nanoparticles supplied by particle supply unit 110 onto the electrically-charged portion(s) of particle collection unit 120, a manipulation unit 140 configured to move and place particle collection unit 120 to a desired position and/or location (e.g., adjacent to a base structure) so as to transfer the nanoparticles collected by particle collection unit 120 onto the base structure, and a post processing unit 150 configured to process the nanoparticles transferred onto the base structure to form a desired target structure thereon.

As used herein, nanoparticles are understood to be particles having the size of about 0.1 nm to about 1000 nm in at least one of three spatial dimensions. The nanoparticles may take various shapes (e.g., a sphere, a disk, a rod, or a tube). Both organic and inorganic substances may be used as nanoparticle material. In one embodiment, the nanoparticles may be made from one or more metals (e.g., iron, nickel, cobalt, indium, tin, or zinc) and/or metal compounds (e.g., metal oxides, metal chalcogenides, or metal hydroxides). Examples of the metal oxides include, but are not limited to, indium oxide, tungsten oxide, tin oxide, indium tin oxide (ITO), or zinc tin oxide (ZTO). In another embodiment, the nanoparticles may be made from one or more semiconductor materials. Examples of such semiconductor materials include, but are not limited to, silicon, silicon carbide, gallium arsenide, or indium phosphide. In one embodiment, the nanoparticles may naturally exhibit positive or negative surface charges. In another embodiment, the nanoparticles may be coated with surfactants or ligands so as to produce surface charges thereon.

Particle supply unit 110 may be configured to perform one or more of various known techniques known in the art to supply positively or negatively charged nanoparticles to the planar surface of particle collection unit 120. Examples of such techniques include, but are not limited to, spraying, dipping, or spinning. In the spraying example, particle supply unit 110 may include a spraying unit configured to aerobically spray a solution including multiple nanoparticles toward particle collection unit 120. In the dipping example, particle supply unit 110 may include a container configured to retain a solution including multiple nanoparticles and receive particle collection unit 120 therein, and optionally, a transport unit configured to move the container to a desired location. In the spinning example, particle supply unit 110 may include a spinning unit to spin-coat a solution containing multiple nanoparticles onto a portion of particle collection unit 120, thereby forming a uniform thin film of the nanoparticle solution onto the portion of particle collection unit 120. The above solution may include substance(s) (e.g., polymers or sugar) for increasing its viscosity. The concrete configurations necessary for the spraying, dipping, or spinning techniques are well known in the art and can be implemented without the need of further explanation herein.

Particle collection unit 120 may be configured to include a planar surface to collect multiple nanoparticles supplied by particle supply unit 110. In one embodiment, as shown in FIGS. 2A and 2B, particle collection unit 120 may include a substrate 221 and an electrode 222, which is disposed on substrate 221 and has a planar surface to collect the positively or negatively charged nanoparticles supplied by particle supply unit 110 thereon. Substrate 221 may be made from one or more materials selected from the group consisting of silicon, sapphire, glass, and polymer. Electrode 222 may be made from one or more materials selected from the group consisting of metals (e.g., aluminum, silicon, copper, gold, tungsten, molybdenum), polycrystalline silicon, metal oxide (e.g., indium tin oxide (ITO), indium zinc oxide (IZO), zinc tin oxide (ZTO), tin oxide, aluminum- or indium-doped zinc oxide, magnesium indium oxide, nickel tungsten oxide), metal nitride (e.g., gallium nitride), metal selenide (e.g., zinc selenide), and metal sulfide (e.g., zinc sulfide).

Figure 3:
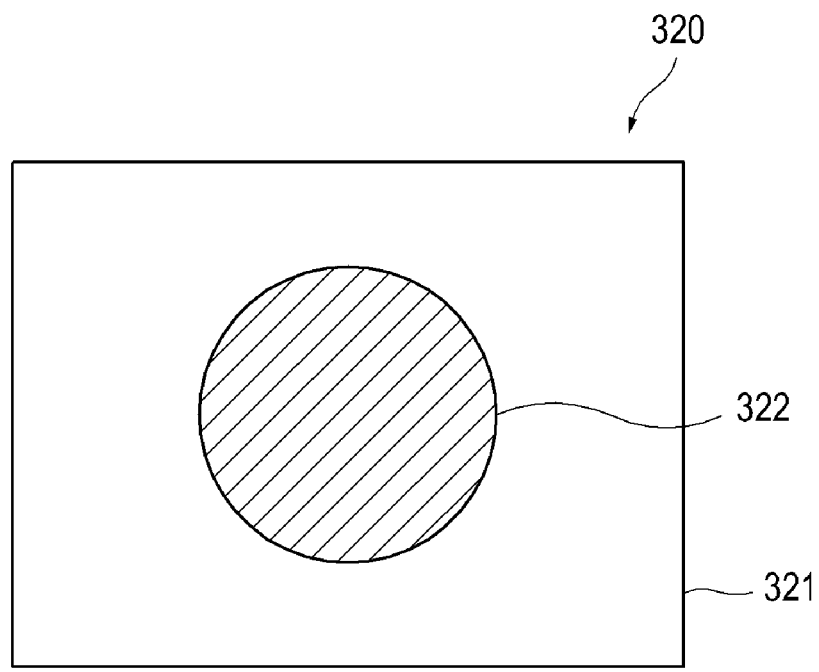
FIG. 3 shows a planar view of an illustrative embodiment of a particle collection unit with a circular electrode.
Figure 4:
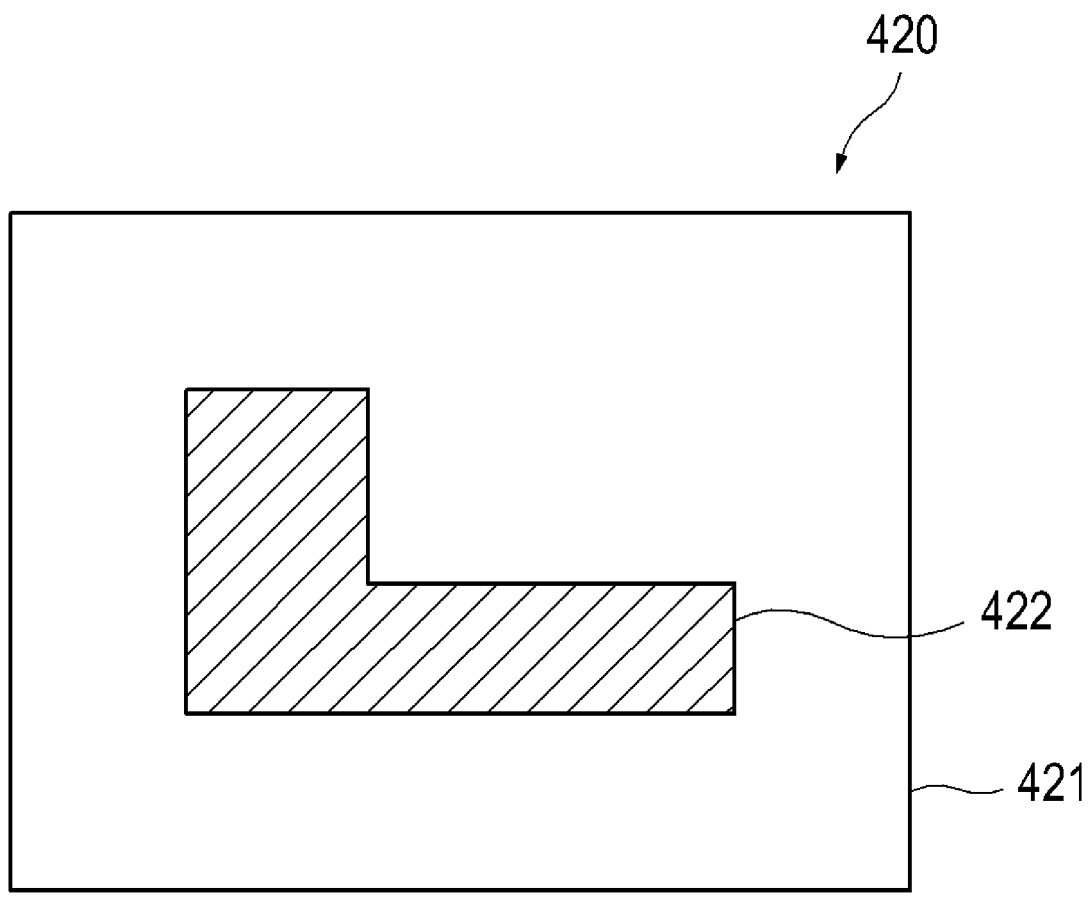
FIG. 4 shows a planar view of an illustrative embodiment of a particle collection unit with an L-shaped electrode.

Particle collection unit 120 described hitherto in conjunction with FIGS. 2A and 2B includes electrode 222 of a rectangular shape. However, it should be appreciated that a particle collection unit in an illustrative embodiment may include an electrode of any arbitrary shape. For example, the electrode of the particle collection unit may be a circular or an L-shaped electrode. In this regard, FIG. 3 illustrates a planar view of an illustrative embodiment of a particle collection unit 320 with a substrate 321 and a circular electrode 322. Also, FIG. 4 shows a planar view of an illustrative embodiment of a particle collection unit 420 with a substrate 421 an L-shaped electrode 422. Further, while the particle collection units illustrated in FIGS. 2A, 2B, 3, and 4 include one electrode, it should be appreciated that a particle collection unit in an illustrative embodiment may include multiple electrodes. In this case, each of the multiple electrodes may be of the same shape or of different shapes.

Referring again to FIG. 1, electrical charging unit 130 may be configured to selectively electrically charge at least a portion of the planar surface of particle collection unit 120 with positive or negative polarity. By electrically charging and/or discharging the planar surface of particle collection unit 120, electrical charging unit 130 may enable particle collection unit 120 to collect on its planar surface and transfer therefrom to another location electrically charged nanoparticles supplied by particle supply unit 110. In one embodiment, electrical charging unit 130 may include one or more electrical sources (e.g., a voltage source), one or more switches and/or one or more wires arranged to electrically charge/discharge the planar surface of particle collection unit 120.

Manipulation unit 140 may include, without limitation, any transport mechanism (e.g., a robot arm, a motor, a conveyor belt, or combinations thereof) that may be configured to hold, rotate, and/or move particle collection unit 120 in a horizontal, vertical, and/or diagonal direction(s), so as to position the same to a desired location. In one embodiment, manipulation unit 140 is operable to move particle collection unit 120 to be juxtaposed to a surface of an arbitrary structure (e.g., the base structure), such that electrode 222 and/or the base structure may be operated (e.g., electrically charged and/or discharged) in a suitable manner to transfer the electrically-charged nanoparticles collected on the planar surface of electrode 222 onto the surface of the base substrate.

Post processing unit 150 may include, without limitation, any processing mechanism that is suitable for processing the nanoparticles transferred onto the base structure to form a desired target structure (e.g., a thin film made of the nanoparticle material) thereon. In one embodiment, post processing unit 150 may include a heating unit configured to heat the nanoparticles, so as to agglomerate them into a cohesive mass (e.g., a thin film).

In another embodiment, post processing unit 150 may further include a gas supply unit to supply one or more gases during the heating process. For example, the gas supply unit may introduce oxidizing gas(es) (e.g., oxygen), reducing gas (es) (e.g., hydrogen, carbon monoxide), and/or inert gas(es) (e.g., nitrogen, argon, helium, carbon dioxide) to create a suitable atmosphere (e.g., an oxidizing, reducing or inert atmosphere) during the heating process. By creating a suitable atmosphere during the heating process, the physical structure and/or chemical composition of the nanoparticles may be altered to have desired properties. Further, unwanted materials attached to the nanoparticles (e.g., surfactants or ligands) may be removed thereby. One skilled in the art would have no difficulty in configuring the heating and gas supply units to operate in appropriate processing conditions (e.g., heating temperature, heating time, or gas types) for a given target structure without any further explanation herein.

In some embodiments, post processing unit 150 may include a metal ion application unit that is configured to apply a solution including metal ions onto the nanoparticles on the base structure. The metal ions may be reduced into metal particles, which may join the spaced-apart nanoparticles on the base structure and aid in further agglomerating the nanoparticles into a cohesive target structure. The metal ion application unit may be configured to perform any suitable known techniques (e.g., spraying or spin-coating) known in the art to apply the metal ion solution onto the nanoparticles.

Figure 6A:
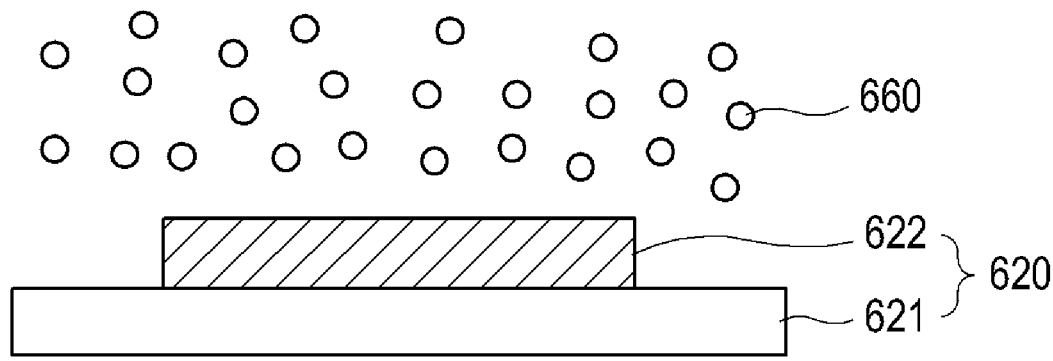
FIGS. 6A-6D are a series of diagrams illustrating some of the method illustrated in FIG. 5.

FIG. 5 shows a flow diagram of an illustrative embodiment of a method for fabricating a structure. FIGS. 6A-6D are a series of diagrams illustrating some of the method illustrated in FIG. 5. The method illustrated in FIG. 5 may be performed by a structure fabrication apparatus similar to the one illustrated in FIG. 1. Referring to FIG. 5, in block 510, negatively-charged nanoparticles 660 (e.g., nanoparticles made of ITO material) are supplied in proximity to a particle collection unit 620 of the structure fabrication apparatus by a particle supply unit (not shown) of the structure fabrication apparatus, as shown in FIG. 6A. Particle collection unit 620 may include a substrate 621 and an electrode 622, which is disposed thereon and has a planar surface. In one embodiment, as shown in FIG. 6A, nanoparticles 660 may be supplied to particle collection unit 620 by aerobically spraying nanoparticles 660 toward particle collection unit 620. However, nanoparticles 660 may be supplied to particle collection unit 620 by using any of a variety of other well-known techniques known in the art (e.g., spinning, spin coating).

Figure 6B:
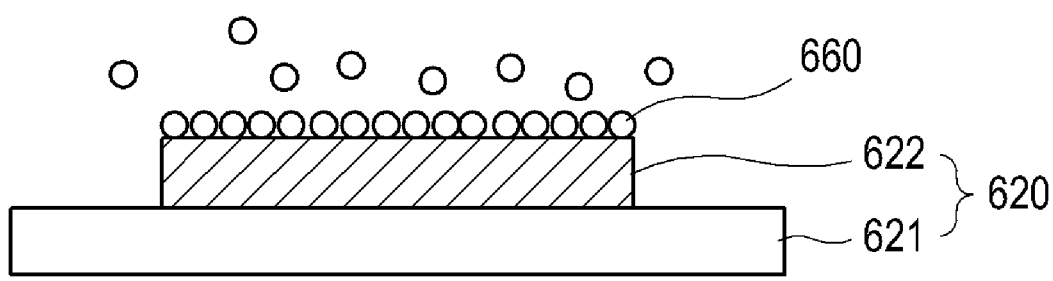
Figure 6C:
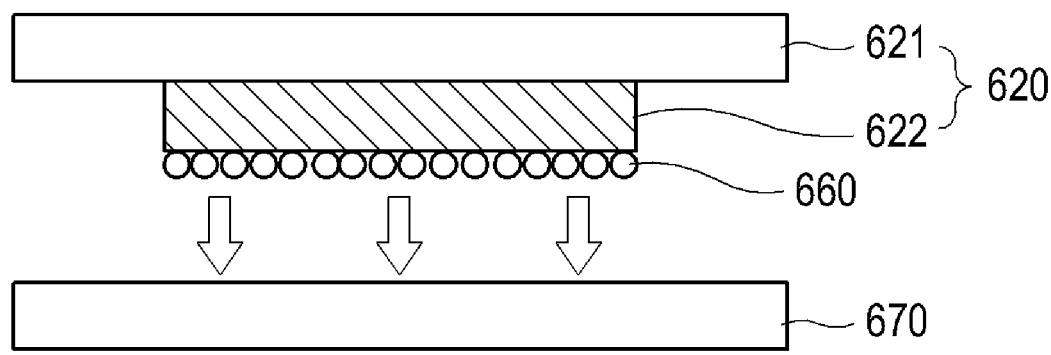

In block 520, as shown in FIG. 6B, electrode 622 of particle collection unit 620 is positively charged by an electrical charging unit (not shown) of the structure fabrication apparatus, so as to collect nanoparticles 660 on the planar surface of electrode 622. In FIG. 6B, only one layer of nanoparticles 660 are shown to be collected on electrode 622. However, it should be appreciated that multiple layers of nanoparticles 660 may be collected on electrode 622. In block 530, as shown in FIG. 6C, particle collection unit 620 is moved to a position by a manipulation unit (not shown) of the structure fabrication apparatus such that the planar surface of its electrode 622 is juxtaposed to a surface of a base structure 670. Base structure 670 may be made of any material that may effectively serve as a base for the target structure to be fabricated by this method.

Figure 6D:
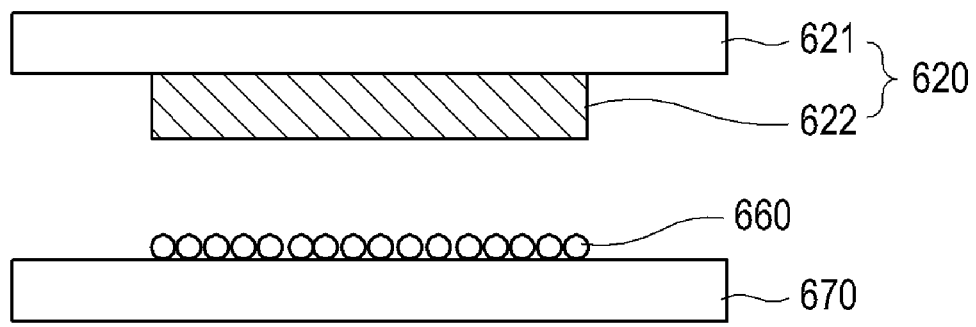

In block 540, as shown in FIG. 6D, nanoparticles 660 collected on electrode 622 are transferred onto the surface of base structure 670 by charging or discharging electrode 622 and/or base structure 670. In one embodiment, electrode 622 may be negatively charged by the electrical charging unit to repel nanoparticles 660 collected on electrode 622 toward the surface of base structure 670. In this embodiment, optionally, base structure 670 may be positively charged by the electrical charging unit to aid in transferring nanoparticles 660 repelled from electrode 622 to the surface of base structure 670. In another embodiment, electrode 622 may be discharged by the electrical charging unit and base structure 670 may be positively charged by the electrical charging unit, so as to attract and transfer nanoparticles 660 on electrode 622 to the surface of base structure 670.

In block 550, nanoparticles 660 transferred onto base structure 670 are processed by a post processing unit of the structure fabrication apparatus to form a desired or target structure on base structure 670. In one embodiment, nanoparticles 660 may be heated at a prescribed temperature under a prescribed atmosphere (e.g., an oxidizing, reducing, or inert atmosphere). Examples of the heating process include, but are not limited to, annealing, sintering, or calcining processes. For example, in cases where nanoparticles 660 are made of ITO material and base structure 670 is made of glass, nanoparticles 660 may be annealed by a heating unit of the post processing unit at a temperature from about 400° C. to about 1000° C. under an inert atmosphere, so as to agglomerate nanoparticles 660 made of ITO material into an ITO electrode on base structure 670. In another embodiment, a metal ion application unit of the post processing unit may apply a solution including metal ions onto nanoparticles 660 on base structure 670 to aid in agglomerating nanoparticles 660 into a cohesive mass, such as the ITO electrode. The processing techniques explained above are for illustrative purposes only and any of a variety of known processing techniques may be employed. One skilled in the art would have no difficulty in selecting suitable known processing techniques to form a given target structure on base structure 670.

One skilled in the art will appreciate that, for this and other processes and methods disclosed herein, the functions performed in the processes and methods may be implemented in differing order. For example, in some embodiments pertaining to the method described in FIG. 5, the operations of block 520 may be performed prior to the operations of block 510. Furthermore, the outlined steps and operations are only provided as examples, and some of the steps and operations may be optional, combined into fewer steps and operations, or expanded into additional steps and operations without detracting from the essence of the disclosed embodiments.

The apparatuses and the methods described hitherto may be employed to fabricate on a base structure a target structure with desired electrical, magnetic, optical, and mechanical properties. For example, the apparatuses and methods may be used to mass-produce target structures on base structures (e.g., transparent electrodes on a glass) that are finely tuned to have a desired conductivity, flexibility, and/or expansion rate.

Further, while the apparatuses and methods described hitherto fabricate a target structure directly on a base structure onto which the collected nanoparticles are transferred, it should be appreciated that apparatuses and methods in accordance with the present disclosure may be implemented in a manner such that the base structure serves as a transferring medium to transfer the nanoparticles transferred onto itself to another base structure.

Figure 7:
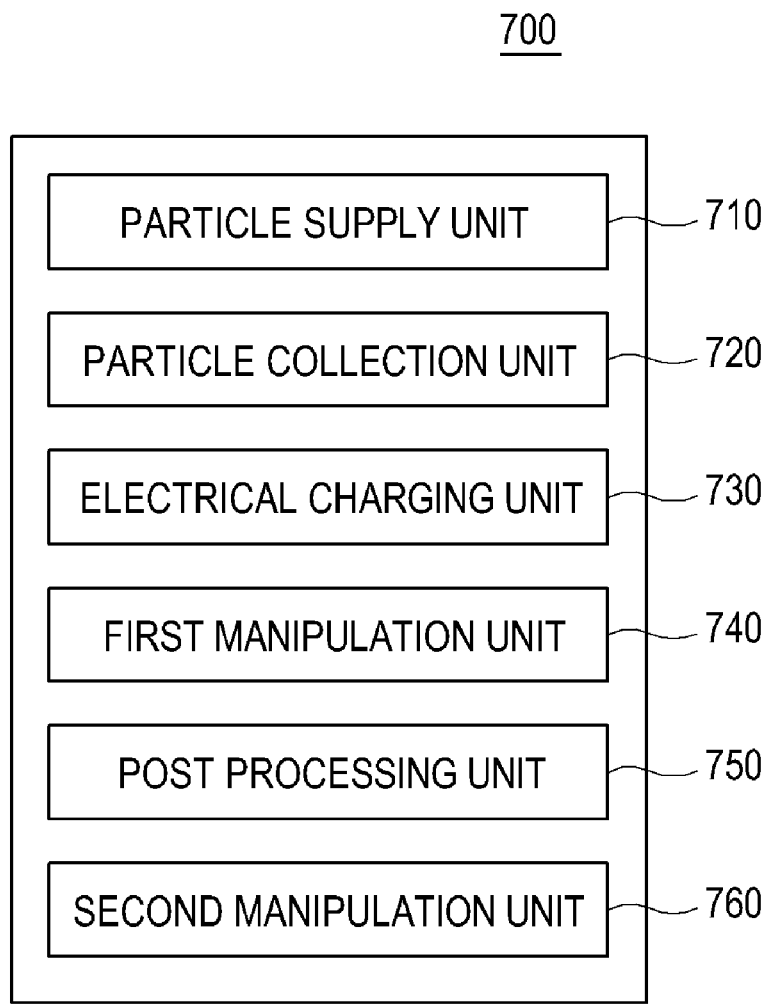
FIG. 7 shows another illustrative embodiment of a structure fabrication apparatus.

FIG. 7 illustrates another illustrative embodiment of a structure fabrication apparatus. Referring to FIG. 7, a structure fabrication apparatus 700 may include a particle supply unit 710, a particle collection unit 720, an electrical charging unit 730, a first manipulation unit 740, a post processing unit 750, and a second manipulation unit 760.

The structural configurations and functions of particle supply unit 710, particle collection unit 720, electrical charging unit 730, first manipulation unit 740, and post processing unit 750 are similar to particle supply unit 110, particle collection unit 120, electrical charging unit 130, manipulation unit 140, and post processing unit 150, respectively, shown in FIG. 1. For the sake of simplicity, the details on units 710-750 are not further explained.

Second manipulation unit 760 may be configured to hold and move (e.g., position) a base structure to a desired location (e.g., in proximity to a second base structure), so as to transfer to the second base structure (a) multiple nanoparticles on the base structure, which have been previously transferred to the base structure from particle collection unit 720, and/or (b) a target structure on the base structure, which has already been made from the multiple nanoparticles by post processing unit 750. In one embodiment, the base structure may be made of a material that has a lower surface energy than that of the second base structure. Suitable materials of low surface energy, which may be used as the material for the base structure, include, but are not limited to, silicon, silicon oxide, quartz, glass, or elastomeric polymers (e.g., polydimethylsiloxane (PDMS)). In this embodiment, second manipulation unit 760 may be configured to move the base structure and the target structure thereon or therein to be in contact with the second base structure and then detach the base structure from the second base structure. Since the base structure has a lower surface energy than the second base structure, the above operations performed by second manipulation unit 760 transfer the nanoparticles or the target structure made therefrom on the surface of the base structure onto the surface of the second base structure. In cases where the surface of the base structure is a patterned surface, the transferred nanoparticles or the target structure on the second structure may form a pattern that substantially corresponds to the patterned surface of the base structure.

Figure 8:
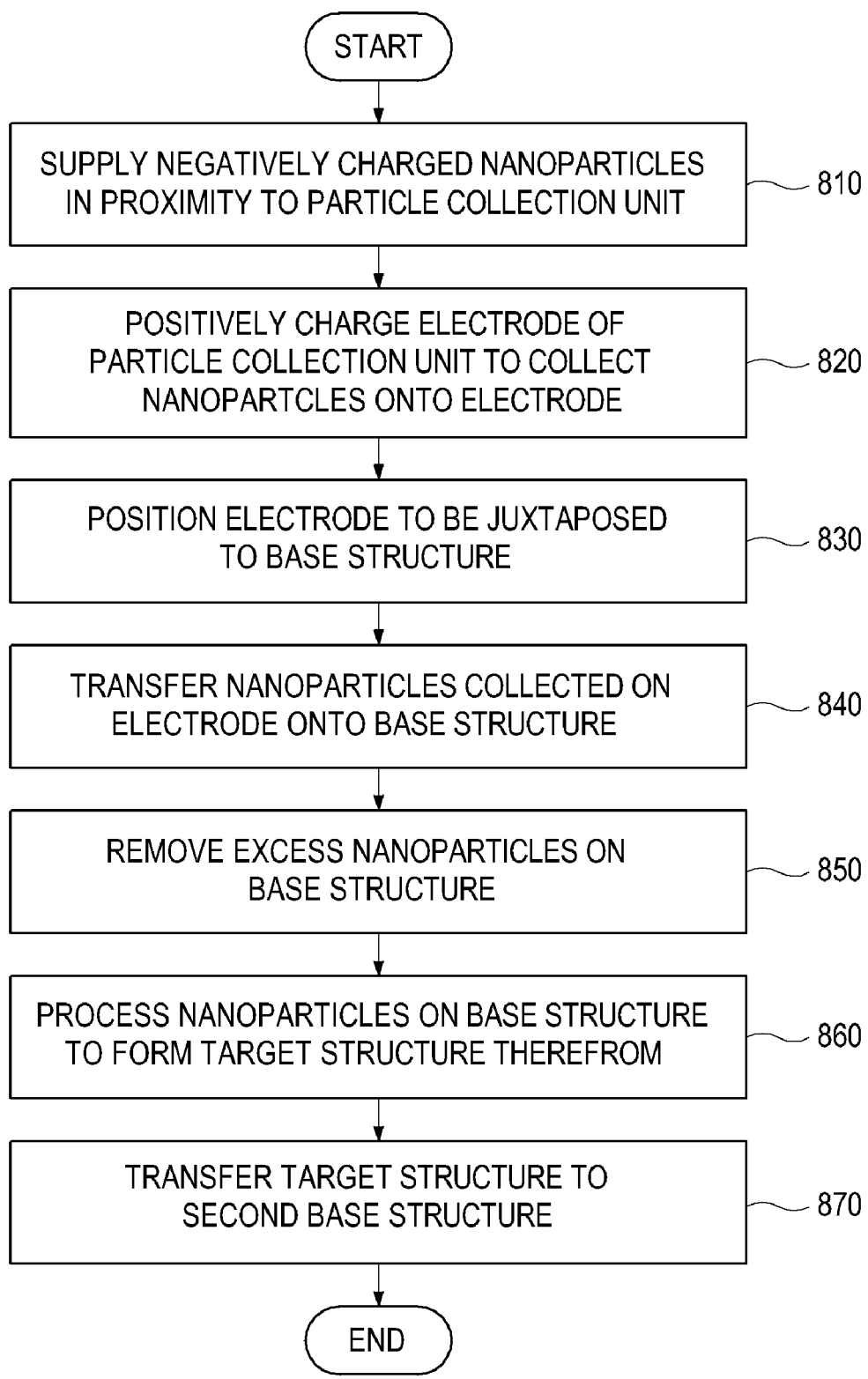
FIG. 8 shows a flow diagram of another illustrative embodiment of a method for fabricating a structure.

FIG. 8 shows a flow diagram of another illustrative embodiment of a method for fabricating a structure. FIGS.

Figure 9A:
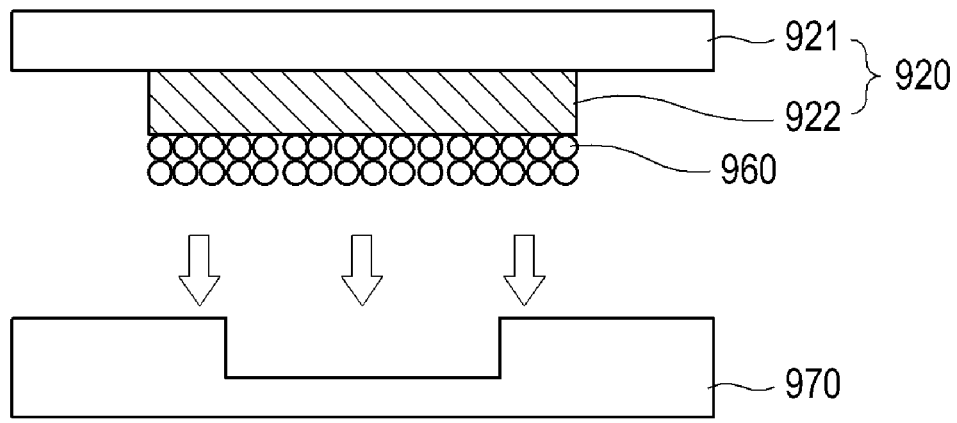
FIGS. 9A-9F are a series of diagrams illustrating some of the method illustrated in FIG. 8.

9A-9F are a series of diagrams illustrating some of the method illustrated in FIG. 8. Referring to FIG. 8, in block 810, negatively-charged nanoparticles are supplied to a particle collection unit of a structure fabrication apparatus by a particle supply unit of the structure fabrication apparatus. FIG. 9A illustrates a cross-sectional view of a particle collection unit 920 including a substrate 921 and an electrode 922 to which multiple nanoparticles 960 are supplied. In block 820, electrode 922 of particle collection unit 920 is positively charged by an electrical charging unit (not shown) of the structure fabrication apparatus, so as to collect nanoparticles 960 on a planar surface of electrode 922. In block 830, as shown in FIG. 9A, particle collection unit 920 is moved to a position by a manipulation unit (not shown) of the structure fabrication apparatus such that the planar surface of electrode 922 is juxtaposed to a patterned surface of a base structure 970. In one embodiment, base structure 970 may be made of PDMS material.

Figure 9B:
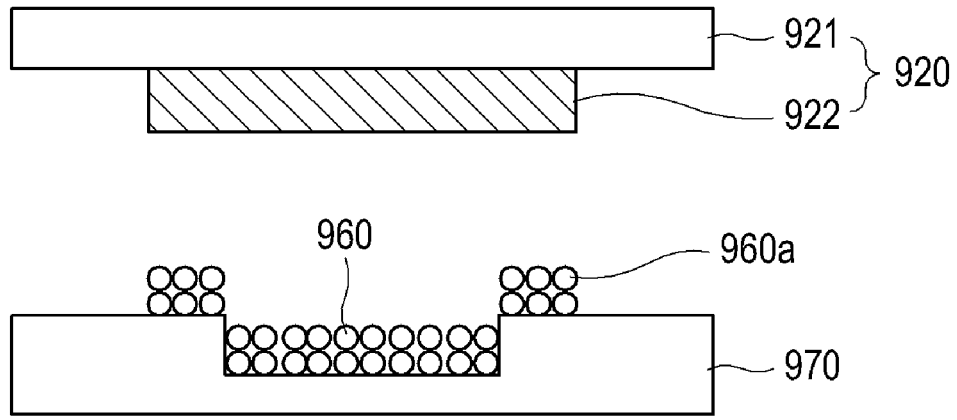
Figure 9C:
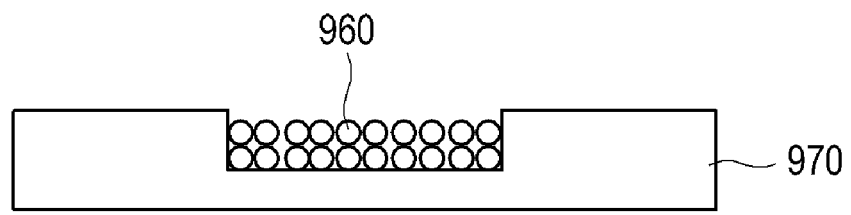

In block 840, as shown in FIG. 9B, nanoparticles 960 collected on electrode 922 are transferred onto the patterned surface of base structure 970 by, for example, negatively charging electrode 922. In block 850, excess nanoparticles 960a on base structure 970 are removed. In this regard, FIG. 9B illustrates base structure 970 having excess nanoparticles 960a on the patterned surface of base structure 970 prior to being removed therefrom, and FIG. 9C illustrates base structure 970 after excess nanoparticles 960a are removed therefrom. In one embodiment, excess nanoparticles 960a may be removed by brushing off excess nanoparticles 960a using an appropriate polishing device.

Figure 9D:
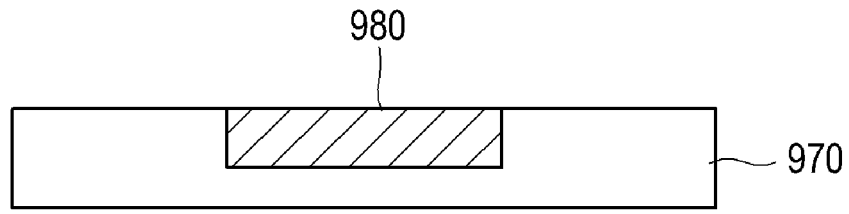
Figure 9E:
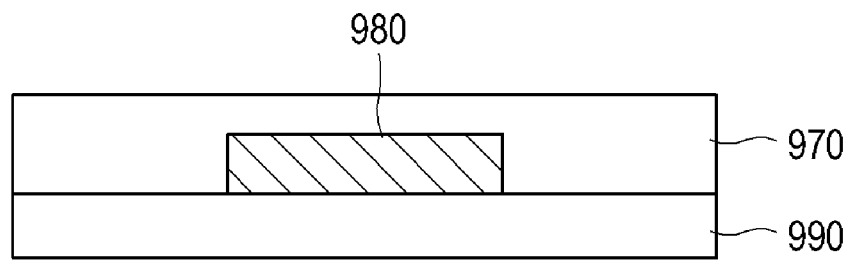
Figure 9F:
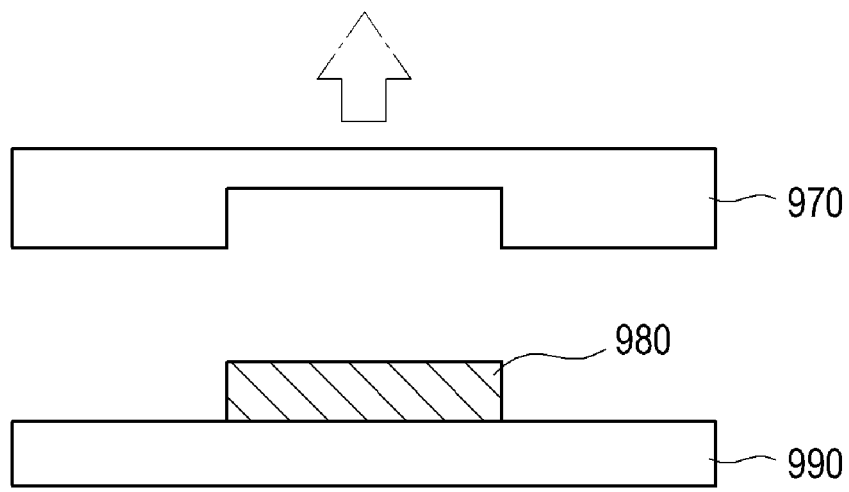

In block 860, as shown in FIG. 9D, nanoparticles 960 on the patterned surface of base structure 970 are processed (e.g., annealed) by a post processing unit of the structure fabrication apparatus to form a target structure 980 therefrom. In block 870, target structure 980 on the patterned surface of base structure 970 is transferred onto a surface of a second base structure. For example, as shown in FIG. 9E, base structure 970 and target structure 980 therein may be moved by a second manipulation unit (not shown) of the structure fabrication unit to be in contact with a second base structure 990, and thereafter, as shown in FIG. 9F, base structure 970 may be detached from second base structure 990 by the second manipulation unit.

The outlined steps and operations in FIG. 8 are only provided as examples, and some of the steps and operations may be optional, combined into fewer steps and operations, or expanded into additional steps and operations without detracting from the essence of the disclosed embodiments. For example, in some embodiments, the operations pertaining to blocks 850 and/or 860 in FIG. 8 may be omitted. Further, with regard to block 870, the known techniques other than the one illustrated with regard to FIGS. 9E and 9F may be employed without departing from the spirit of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g. bodies of the appended claims) are generally intended as "open" terms (e.g. the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g. "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g. the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g. "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g. "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third, and upper third, etc. As will also be understood by one skilled in the art all language such as "up to," "at least," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

The invention claimed is:

1. A method performed under the control of at least one apparatus for fabricating a structure from nanoparticles, the method comprising:
   supplying a plurality of solid nanoparticles electrically charged with a first polarity in proximity to a particle collection device having a planar surface on a portion thereof, the solid nanoparticles having a three-dimensional shape and comprising an inorganic material;
   electrically charging the planar surface of the particle collection device with a second polarity opposite the first polarity, so as to collect the supplied nanoparticles onto at least a portion of the planar surface of the particle collection device;
   positioning the planar surface of the particle collection device to be juxtaposed to a base structure; and
   transferring the nanoparticles collected on the planar surface of the particle collection device onto at least a portion of the base structure.

2. The method of claim 1, wherein the transferring comprises electrically charging the planar surface of the particle collection device with the first polarity.

3. The method of claim 2, wherein the transferring further comprises electrically charging the base structure with the second polarity.

4. The method of claim 1, wherein the transferring comprises:
   electrically charging the base structure with the second polarity; and
   discharging the planar surface of the particle collection device of the second polarity.

5. The method of claim 1, wherein supplying the electrically charged nanoparticles comprises spraying the plurality of nanoparticles in proximity to the particle collection device.

6. The method of claim 1, wherein supplying the electrically charged nanoparticles comprises immersing the particle collection device in a solution including the plurality of nanoparticles.

7. The method of claim 1, wherein supplying the electrically charged nanoparticles comprises spin-coating a solution including the plurality of nanoparticles onto at least a portion of the planar surface of the particle collection device.

8. The method of claim 1, further comprising applying a solution including metal ions onto the nanoparticles transferred onto the base structure.

9. The method of claim 1, further comprising heating the nanoparticles transferred onto the base structure.

10. The method of claim 1, further comprising transferring the nanoparticles from the base structure to another base structure.

11. The method of claim 10, wherein the base structure is made from a material selected from the group consisting of silicon, silicon oxide, quartz, glass, and elastomeric polymers.

12. The method of claim 1, wherein the particle collection device comprises:
   a substrate; and
   an electrode disposed on the substrate and defining the planar surface.

13. The method of claim 12, wherein the electrode is made from a material selected from the group consisting of metal, metal oxide, metal nitride, metal selenide, metal sulfide, and polycrystalline silicon.

14. The method of claim 1, wherein the nanoparticles are made from a material selected from the group consisting of indium oxide, tungsten oxide, tin oxide, indium tin oxide (ITO), and zinc tin oxide (ZTO).

15. The method of claim 1, wherein the supplying comprises coating the plurality of nanoparticles with at least one ligand.

16. The method of claim 1, wherein the three-dimensional shape is selected from the group consisting of a sphere, a disk, a rod, a tube, and combinations thereof.

17. The method of claim 1, further comprising agglomerating the plurality of nanoparticles to form a film.

18. The method of claim 17, wherein the agglomerating comprises at least one of annealing, sintering, or calcining the plurality of nanoparticles.

* * * * *

UNITED STATES PATENT AND TRADEMARK OFFICE
CERTIFICATE OF CORRECTION

PATENT NO. : 8,029,869 B2
APPLICATION NO. : 12/500904
DATED : October 4, 2011
INVENTOR(S) : Lee Page 1 of 1

It is certified that error appears in the above-identified patent and that said Letters Patent is hereby corrected as shown below:

On the Title Page, in the Figure, for Tag "520", in Line 3, delete "NANOPARTCLES" and insert -- NANOPARTICLES --, therefor.

In Fig. 5, Sheet 4 of 9, for Tag "520", in Line 3, delete "NANOPARTCLES" and insert -- NANOPARTICLES --, therefor.

In Fig. 8, Sheet 7 of 9, for Tag "820", in Line 3, delete "NANOPARTCLES" and insert -- NANOPARTICLES --, therefor.

In Column 8, Line 12, delete "e.g." and insert -- e.g., --, therefor at each occurrence throughout the specification.

In Column 9, Line 4, delete "thereof" and insert -- thereof. --, therefor.

Signed and Sealed this
Nineteenth Day of June, 2012

David J. Kappos
*Director of the United States Patent and Trademark Office*